UNITED STATES PATENT OFFICE.

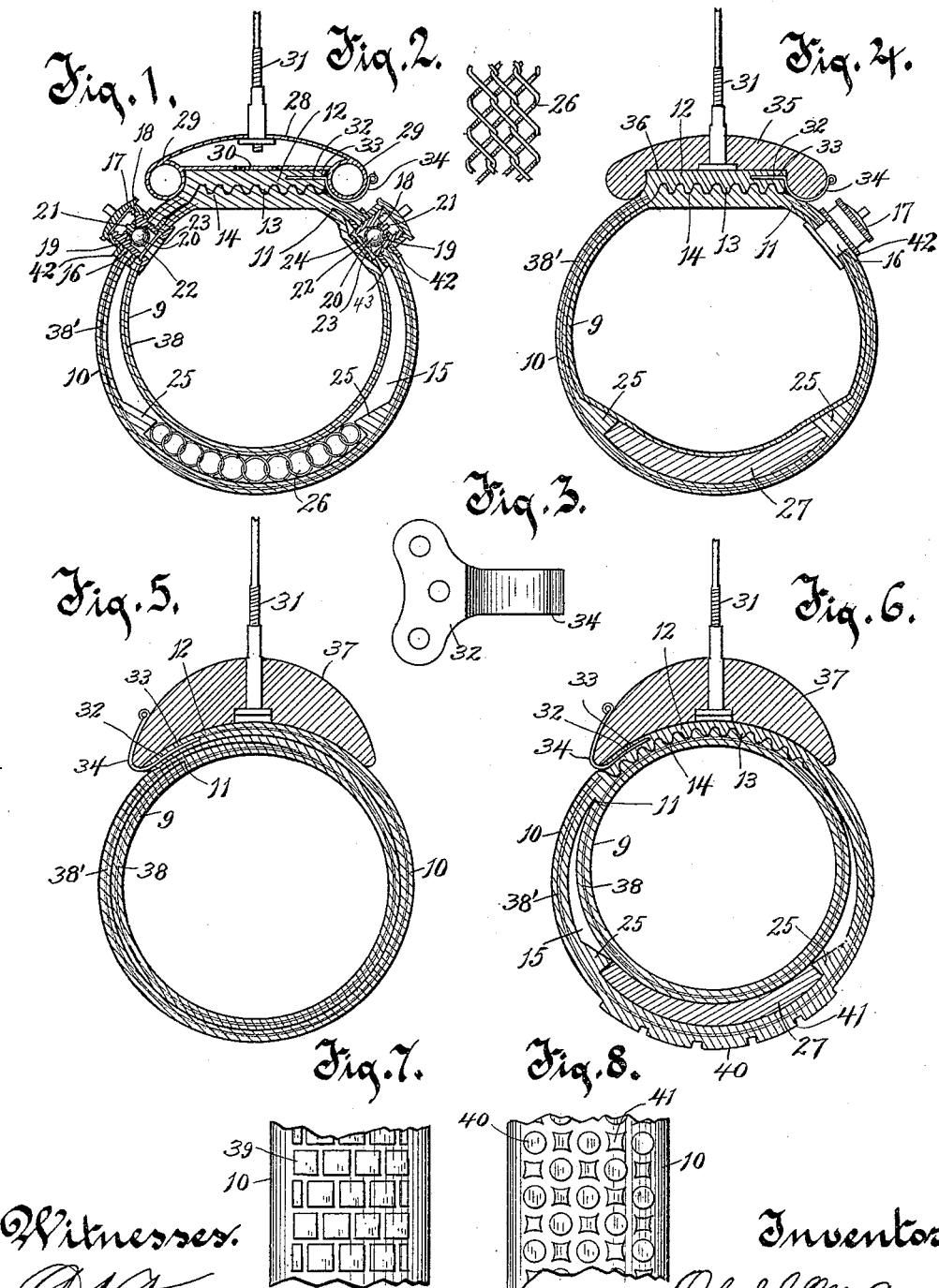

OLAF J. M. ANCORA, OF MILWAUKEE, WISCONSIN.

TIRE FOR WHEELS.

SPECIFICATION forming part of Letters Patent No. 640,851, dated January 9, 1900.

Application filed October 14, 1897. Serial No. 655,101. (No model.)

*To all whom it may concern:*

Be it known that I, OLAF J. M. ANCORA, of Milwaukee, in the county of Milwaukee and State of Wisconsin, have invented a new and useful Improvement in Tires for Wheels, of which the following is a description, reference being had to the accompanying drawings, which are a part of this specification.

My invention has relation to improvements in tires and rims for wheels, more especially for bicycle-wheels.

The object is to provide a construction in which the tire is most effectually protected against puncture and one at the same time in which if a puncture by any possibility occur ready access can be obtained to said puncture for the purpose of repair.

Furthermore, the invention provides for a more convenient location for the valve and contemplates also an improved form of rim of such construction as to prevent cutting the sides of the tire should the machine be ridden when the tire is deflated.

With the above objects in view the invention consists of the devices and parts or their equivalents, as hereinafter more fully set forth.

In the accompanying drawings, Figure 1 is a sectional view of a tire equipped with my improvements. Fig. 2 is a detail view of a filling for the space between the inner and outer portions of the tire, at the tread thereof. Fig. 3 is a view of detail. Fig. 4 is a cross-section of a modified form. Figs. 5 and 6 are cross-sections of other modified forms. Figs. 7 and 8 are fragments of the tread of the tire, showing the preferred form of constructing said tread.

The tire in all the several forms is composed of inner and outer portions 9 and 10, respectively, said inner portion constituting an inner closed tube and the outer portion an outer covering connected with the inner tube at a desired point. This construction is preferably obtained by dividing the rubber or material composing the tire through its thickness, said division beginning at a point indicated by the numeral 11 in the several figures of the drawings and extending through the end of the rubber or other material composing the tire. The terminal end forms an overlapping tongue 12, which is located where the rim of the wheel is connected to the tire.

In the construction shown in Figs. 1, 4, and 6 the overlapping tongue 12 is located where the rim of the wheel is connected to the tire.

In the construction shown in Figs. 4 and 6 the overlapping tongue is formed on its under side with a series of ribs 13, and the surface immediately below the overlapping tongue is provided with similar ribs, forming a series of recesses 14 to receive said ribs 13. By the engagement of the ribs 13 of the tongue with the recesses the two portions of the tire are held against lateral separation and at the same time in Figs. 1 and 6 perform the important function of providing a perfectly air-tight chamber 15.

In the forms of construction illustrated in Figs. 1 and 6 the outer portion 10 of the tire is sufficiently greater in diameter than the inner portion 9 to form the space or chamber 15 between the sides and bottoms of said two portions, providing practically inner and outer tubes. These are both adapted to be inflated with air, so that two pneumatic tubes are provided. It is desirable and advisable that the double pneumatic tire be constructed in such manner that the connection of the cover with the inner closed tube—that is to say, the beginning of the dividing-point 11—must be located at such a place as to be either just inside of the rim of the wheel or in line with the edge of the rim. By thus making the connection between the inner closed tube and the outer cover within the rim of the wheel or on a line with the edge of the rim the pressure of the air in the chamber 15 prevents splitting of the tire. For the purpose of inflating these tubes I prefer to use peculiar forms of valve mechanism. These valve mechanisms are only shown in Figs. 1 and 4, but it will be understood that similar valve mechanisms are also employed in Figs. 5 and 6. Each valve-casing is composed of two sections—viz., a tubular exteriorly-threaded portion 16 and an outer interiorly-threaded cap-piece 17. The cap-pieces are turned onto the outer ends of the tubes 16, so as to retain the air. When, however, it is desired to inflate, these caps are removed and the air-pump attachment secured thereon in the usual and well-known manner. Each valve-casing 16 is provided with an interior diaphragm 18, and each diaphragm has an air-opening 19 therethrough. A ball-valve 20 is fitted beneath the diaphragm and is provided with a guide-stem 21, extending outwardly through the opening 19. These valves (in order to render them air-tight) are provided with coverings 22 of rubber or analogous material. When the tire is inflated, the valves are held up to the diaphragms by means of the internal air-pressure. A cross-bar 23 is provided in each valve-casing 16, so as to prevent the valve therein from dropping inwardly through the valve-casing when the tire is deflated. In the case of the valve-casing for the inner tube said casing extends through both portions 9 and 10, as clearly shown by the left-hand valve-casing in Fig. 1, so that a clear passage is afforded to the inner tube through the opening in the bottom of the valve-casing. In the case of the outer tube, however, as the inner end of the valve-casing 16 thereof abuts against the inner portion 9 of the tire I preferably provide said valve-casing 16 with air-openings 24, arranged on the sides of the valve-casing, through which the air is free to pass and fill the space 15. A nut 42 engages the threaded valve-casing and serves to hold said casing in place, preventing it from falling into the tire when the cap 16 is unscrewed. Each valve-casing is also formed or provided at its inner end with a flange 43, which prevents the valve-casing from working or pulling outwardly. This flange, together with nut 42, forms a clamp for holding the valve-casing in place.

It will be understood that the valve must be so located that no part of said valve will extend outside of a vertical line drawn coincident with the most projecting peripheral point on the side of the tire when said tire is inflated, thus obviating the danger of knocking off the valve-cap by contact with any obstruction or projection encountered outside of the wheel. As the tire when deflated is widened out from side to side and is thereby made broader than when inflated, the valve-cap (when the valve is located as hereinbefore described) is even more secure against contact with obstructions than when the tire is inflated, as the greater peripheral projections on the sides of the deflated tire will act to still more effectually guard the valve from being thrown off by any obstruction outside of the wheel. Another advantage gained in locating the valve as herein shown and described is that I avoid entirely the weakening of the rim of the wheel, such as results when the valve is applied to the rim and a hole necessarily drilled through the rim for the location of said valve. Furthermore, another disadvantage is avoided— viz., the ever-present liability of the creeping of the tire, which so frequently causes the valve to be cut off, resulting in instantaneous deflation and rendering road repair most difficult. Again, in having the valve on the side of the tire it makes it easier to remove the tire from the rim.

In using a cap on my valve no material change is made in the construction of the common valve, and any valve could therefore be used.

The valve may be arranged as usual in a hole through the rim of the wheel, but I prefer to do away with the opening in the rim for this purpose and to place the valve or valves on the side or sides of the tire, thus obviating the danger of breaking the pump-hose or valve-stem. By this arrangement the outer side of the tire will serve as a washer for the valve-cap 17, thus making an air-tight closure. (See left-hand valve in Fig. 1.) The opening in the side of the tire for the valve must be such a distance from the sides of the rim that the valve will not come in contact with the rim when the bicycle or vehicle is in motion.

Fig. 4 is similar to the construction shown in Figs. 1 and 6, excepting that the space 15 is not continued around the sides of the tube, but is only provided between the bottoms of the inner and outer portions 9 and 10, respectively. At the sides the portions 9 and 10 are adjacent to each other.

In Figs. 1, 4, and 6 the inner surface of the outer portion 10 of the tire is provided with projecting lugs 25 25, arranged in the lower portion of the tire at a desired distance apart and projecting into the space 15. I prefer to fill the space confined between the lugs 25 25 with some suitable material, which can easily be removed and another substituted therefor and will resist puncture or hold the two portions 9 and 10 separated a sufficient distance to prevent a tack or projection of ordinary length and which may pass through the tread of the outer portion 10 from extending into and puncture the inner portion 9. By this construction of double pneumatic tire the rider can, if the tire should become punctured and thereby deflated, continue to ride the bicycle, as the inflated non-punctured inner tube will still be serviceable. In Fig. 7 I have shown this space as filled with an elastic woven-wire filling 26, which is also shown in detail in Fig. 2. Any other kind of woven wire can be used, the form delineated in Figs. 1 and 2 being shown only by way of illustration. In Figs. 4 and 6 I show a filling of felt, leather, horsehair filling, or other analogous material 27, which fills the length of the space between the lugs 25. It will be of course understood that in the case of the form shown in Fig. 4 only one pneumatic tubing is provided— viz., an inner tubing—and that consequently but one valve mechanism is essential.

Fig. 5 differs from the other figures which have been described in that no space whatever is left between the inner and outer portions 9 and 10 and the meshing corrugations at the joint are omitted. It is also of such construction that the inner part of the tire is a closed tube and the outer part is curled continuously around the inner part. It will of course be understood that the inner part of this form of construction may be made elastic, if desired, and the inner surface of the outer part provided with lugs, filling, as in Fig. 4.

In Fig. 1 one form of wheel-rim is shown. This rim is indicated by the numeral 28 and consists of a hollow metallic body having a flat outer side which is adjacent to a corresponding flat outer surface of the overlapping tongue 12. The inner side of this rim is preferably rounded or convex, and the ends of the rim are also rounded and, if preferred, tubular, as indicated at 29 29. These tubular ends are adjacent to the side edges of the overlapping tongue 12 and together with the flat outer side of the rim form a recess for the reception of the tire. The outer flat side of the rim is provided with an opening 30, which permits the spokes 31 of the wheel to be passed therethrough and secured through the inner side of the rim, as clearly shown in Fig. 1. In order to assist the ribs 13 in finding their proper place for meshing with the recesses and to relieve the wood or metal of the rim of all splitting strain (which strain exists in all so-called "clencher-tires") and to prevent the overlapping tongue from lateral separation, I provide a plate 32, which is inserted and held fast in a slit 33, formed in the outer edge of the tongue 15. Any desired number of these plates around the tire can be provided. The outer portion of this plate is bent downwardly or concaved, as indicated at 34, to form a pocket for the reception of one of the rounded ends of the rim of the wheel. It is evident from this construction that even should the intermeshing corrugations become disengaged the engagement of the rounded end of the rim with the pocket or concavity 34 of the plate 32 will prevent the separation of the tongue 12 from the remaining portion of the tire. The rim shown in Fig. 4 and indicated by the numeral 35 is similar in form to the rim shown in Fig. 1. Instead of being hollow, however, it is solid and made of wood, laminated or of one piece, or any other desirable material, being formed on its under side with a recess 36 to receive the squared portion of the tongue 12.

The rims indicated in Figs. 5 and 6 and designated by the numerals 37 37 are the ordinary forms of rims now commonly employed on bicycle-wheels, having the outer concave surface to receive the similar contour of the tire instead of being provided with a recess similar to the recess 36 of Fig. 4 to receive a squared portion of the tire. The plates 32 shown in Figs. 5 and 6 owing to the somewhat-different form of rim shown in said figures, are shaped slightly different from those illustrated in Figs. 1 and 4 in order to conform to the shape of the rims 37. They are, however, in all essential particulars substantially like those shown in Figs. 1 and 2 and subserve a similar function.

In Fig. 1 I have shown in both the inner and outer portions 9 and 10 an intermediate layer of canvas or similar material, whereby both the inner and outer portions are rendered non-elastic. These layers are indicated, respectively, by the numeral 38 38'. I also show these inner and outer layers in Figs. 5 and 6. In Fig. 4 I only show the layer 38' in the outer portion 10, so that the inner portion is rendered elastic, while the outer portion is almost rendered non-elastic. It will also be understood that said inner portion may be rendered non-elastic, if desired.

I wish it understood that I do not intend to limit myself to merely one layer for securing the non-elasticity, but a plurality of layers may be employed, if desired.

If desired, the meshing ribs in Figs. 1, 4, and 6 or the projecting edge of Fig. 5 can be pasted together with any suitable paste, and this will enable the parts to be easily taken apart for repairing a puncture, &c., without disturbing the tire.

Figs. 6, 7, and 8 represent a preferred manner of constructing the tread of the tire. This construction is designed to secure a firm grip by the tread of the tire on the surface traveled over and at the same time act as a means for throwing the dirt and mud from off the tread. Fig. 6 shows a fragment of the tread of the tire, illustrating one means, which consists of forming said tread with a series of rectangular or square projections 39, said projections necessarily leaving a series of spaces therebetween. As the wheel is revolved these projections are compressed and forced together without leaving a space at any point, making it practically a continuous smooth surface, and immediately after contact with the surface traveled over they resume their normal shape and in doing so tend to throw off any mud, dirt, or adhering particles, so that the tread of the wheel is self-cleaning. In the form illustrated in Fig. 8 each alternate projection is of a different shape. One projection 40 is circular and the next projection 41 square or rectangular, with the sides of the square or rectangle concave. Fig. 6 is a section through a tire having the tread formed with the projections shown in Fig. 8. It is obvious that the projections 40 41 of Fig. 8 will subserve the same function as the projections 39 of Fig. 7.

I wish it understood that in case of the constructions shown in Figs. 1, 4, and 6, where the intermeshing corrugations and teeth are employed, if desired the double pneumatic tire can be formed by having the outer cover made separate from the inner tube; but I prefer in these forms of construction to have the cover connected with the inner closed tube, as this arrangement is more convenient and there is less danger of getting out of order.

My tire is preferable to other kinds of double-tube tires on account of the ease with which most punctures can be repaired without removing the tire from the rim, and also it is eminently adapted for wood rims, which are considerably lighter than steel. Wood rims are not so suitable for most of the detachable double-tube tires, owing to the strong outward strain tending to break the rim in its weakest section, whereas my tire construction readily strengthens the rim by gripping it very tightly when inflated, thus acting much in the same way as the iron tire of a carriage-wheel.

By having the valve arranged on the side of the tire, as in my improved construction, it is possible to repair a puncture of the inner tube of the tire without removing the tire from the rim. (See Fig. 4.) In order to accomplish this, it is only necessary to unroll the tire, letting the squared part remain in connection with the rim, rolling the inner tube out, and the tire can then be reinflated and the puncture found. The same advantageous arrangement is secured by placing the valve on the left side of the tire, (shown in Figs. 5 and 6,) thus doing away with the trouble of unscrewing the wheel and pasting the tire again after repairing.

In the operation of inflating my tire the inner tube must first be inflated. The pressure of the air in the inner tube will thus make the connection between the overlapping edge of the cover and the part of the tire below an air-tight closure. The compartment between the inner closed tube and the cover can then thereafter be inflated or both compartments of the tire can be inflated at once.

In the operation of repairing the tire the inner tube should be rolled outside of the cover and deflated. The puncture can then be readily found in the usual way by dipping the inner tube in water, &c.

What I claim is—

1. A tire consisting of an inner closed tube and an outer cover connected therewith at one place, but elsewhere divided or separated therefrom and rolled around the inner tube, the end of said outer cover overlapping the inner tube under the rim of a wheel.

2. The combination with a tire for wheels consisting of an inner closed tube and an outer cover connected therewith at one place, but elsewhere divided or separated therefrom and rolled around the inner tube, the end of said outer cover overlapping the inner tube under the rim of a wheel, of means for preventing the separation of the end of the outer cover from the portion of the tire below the same.

3. A tire consisting of an inner closed tube and an outer cover connected therewith at one place, but elsewhere divided or separated therefrom and rolled around the inner tube, the end of said outer cover overlapping the inner tube under the rim of a wheel, and said end of the outer cover provided on its under side with ribs adapted to engage registering recesses in the portion of the tire beneath the same.

4. A tire for wheels, consisting of an inner elastic portion and an outer substantially non-elastic portion, said portions comprising an inner closed tube and an outer cover connected therewith at one place, but elsewhere divided therefrom and rolled around the inner tube, the end of said outer cover overlapping the inner tube under the rim of a wheel.

5. The combination, of a tire composed of inner and outer portions, a plate secured to the outer portion, said plate formed with a concavity or pocket, and a rim having a part thereof fitting in said concavity or pocket.

6. A tire comprising inner and outer portions, the end of the outer portion provided on its under side with depending teeth, and the upper surface of the inner portion beneath the end of the outer portion provided with recesses to receive the teeth, a plate secured to said terminal portion, said plate formed with a concavity or pocket, and a rim having a part thereof fitting said concavity or pocket.

7. The combination of a tire consisting of an inner closed tube and an outer cover connected therewith at one place, but elsewhere divided or separated therefrom and rolled around the inner tube, the end of said outer cover formed with a squared and shouldered portion, and a rim provided with a recess similar in shape to and adapted to receive the squared and shouldered portion of the end of the cover.

8. The combination with a tire comprising inner and outer portions, the end of the outer portion formed with a squared and shouldered projection, a plate secured to the outer portion, said plate formed with a concavity or recess, and a hollow rim provided with a recess similar in shape to and adapted to receive the squared and shouldered portion, and said rim also provided with rounded ends fitting the concavity or pocket of the plate.

9. A tire consisting of an inner closed tube and an outer cover connected therewith at one place, but elsewhere divided or separated therefrom and rolled around the inner tube, the end of said outer cover overlapping the inner tube under the rim of a wheel, the two portions of the tire forming an inner and an outer tube, the outer tube being of such circumference as to provide a compartment between it and the inner tube.

10. The combination, with a tire consisting of an inner closed tube and an outer cover connected therewith at one place, but elsewhere divided or separated therefrom and rolled around the inner tube, the end of said outer cover overlapping the inner tube under the rim of a wheel, the two portions of the tire forming an inner and an outer tube, the outer tube being of such circumference as to provide a compartment between it and the inner tube, of mechanism leading, respectively, to said inner and outer tubes, whereby said tubes may be inflated so as to form a double pneumatic tire.

11. The combination, with a tire consisting of an inner closed tube, and an outer cover connected therewith at one place, but elsewhere divided or separated therefrom and rolled around the inner tube, the end of said outer cover overlapping the inner tube under the rim of a wheel, the two portions of the tire forming an inner and an outer tube, the outer tube being of such circumference as to provide a compartment between it and the inner tube, and said outer tube being provided on its inner surface at the tread with lugs or projections located a desired distance apart, and the end of the outer portion being detachably secured to the inner portion, of a filling inserted between the two portions of the tire and confined between the two lugs.

12. The combination, with inner and outer tubes, the outer tube being of such circumference as to leave a compartment between it and the inner tube, lugs or projections located within the compartment and at the tread and arranged a desired distance apart, of a ring of woven-wire filling arranged in said compartment and confined between the lugs.

13. A tire consisting of an inner closed tube and an outer cover connected therewith at one place, but elsewhere divided or separated therefrom and wound in a continuous cover around the inner closed tube, the end of said outer cover overlapping the inner tube under the rim of a wheel.

14. A tire for wheels consisting of an inner substantially non-elastic portion and an outer substantially non-elastic portion, said portions comprising an inner closed tube and an outer cover connected therewith at one place, but elsewhere divided therefrom and rolled around the inner tube, the end of said outer cover overlapping the inner tube under the rim of a wheel.

15. A tire consisting of an inner closed tube and an outer cover connected therewith at one place, but elsewhere divided or separated therefrom and rolled all around the inner closed tube, which is thereby inclosed by the outer cover.

16. A tire consisting of an inner closed tube, and an outer cover connected therewith at one place, but elsewhere divided or separated therefrom and rolled around the inner closed tube, which is thereby inclosed by the outer cover, and means for securing the outer cover to the rim.

17. A tire consisting of an inner closed tube and an outer cover connected therewith at one place, but elsewhere divided or separated therefrom and rolled around the inner tube, one end of said outer cover overlapping the inner tube and the connection between the inner closed tube and the outer cover.

18. A tire consisting of an inner closed tube and an outer cover connected therewith at one place, but elsewhere divided or separated therefrom and rolled around the inner tube under the rim of a wheel, means for preventing the separation of the end of the cover from the portion of the tire below the same, and means for connecting the outer cover to the rim.

19. A tire consisting of an inner closed tube and an outer cover connected therewith at one place, but elsewhere divided or separated therefrom and rolled around the inner tube, the point of connection to the outer cover being at such a place as to be within or in line with the edge of the rim, and the end of said outer cover overlapping the inner tube under the rim of a wheel.

20. The combination, with a tire consisting of an inner closed tube and an outer cover connected therewith at one place, but elsewhere divided or separated therefrom and rolled around the inner tube, the end of said outer cover overlapping the inner tube under the rim of a wheel, said outer cover thereby forming a tube, but adapted to be opened on one side under the rim of a wheel, of means for preventing the separation of the end of the outer cover from the portion of the tire below the same.

21. A double pneumatic tire comprising an inner closed tube and an outer portion or tube, both being inflatable, the outer portion being provided on its under side with ribs or projections and the inner closed tube provided with recesses to receive the ribs or projections.

22. The combination, of a tire consisting of an inner closed tube and an outer cover connected therewith at one place, but elsewhere divided or separated therefrom and rolled around the inner tube, the end of said outer cover overlapping the inner tube under the rim of a wheel, and a valve, said valve located at the side of the tire.

23. The combination, of a tire consisting of an inner closed tube and an outer cover connected therewith at one place, but elsewhere divided or separated therefrom and rolled around the inner tube, the end of said outer cover overlapping the inner tube under the rim of a wheel, means for preventing the separation of the end of the outer cover from the portion of the tire below the same, and a valve located at the side of the tire.

24. The combination, with a tire consisting of an inner closed tube and an outer cover connected therewith at one place, but elsewhere divided or separated therefrom and rolled around the inner tube, the end of said outer cover overlapping the inner tube under the rim of a wheel, means for preventing the separation of the outer cover from the portion of the tire below the same, means for having the outer cover in fixed connection to the rim, and a valve located at the side of the tire, the inner closed tube being thereby adapted to be opened or unrolled for the purpose of repairing the same, without the necessity of removing the tire from the rim of a wheel, or of removing the cap from the valve, or of removing the valve from the rim.

In testimony whereof I affix my signature in presence of two witnesses.

OLAF J. M. ANCORA.

Witnesses:
A. L. MORSELL,
ANNA V. FAUST.